(12) United States Patent
George et al.

(10) Patent No.: US 6,740,399 B1
(45) Date of Patent: *May 25, 2004

(54) MULTI-LAYERED SEALANT

(75) Inventors: Clayton A. George, Afton, MN (US); Michael A. Johnson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/713,382

(22) Filed: Nov. 15, 2000

Related U.S. Application Data (62) Division of application No. 09/409,520, filed on Sep. 30, 1999, now Pat. No. 6,316,099, which is a continuation of application No. PCT/US99/07195, filed on Mar. 31, 1999.

(51) Int. Cl.[7] .............................. B32B 27/38; B32B 7/12
(52) U.S. Cl. .............................. 428/355 EP; 428/317.7; 428/328.8; 428/314.4; 428/317.1; 428/319.3; 428/426; 428/430; 428/457; 428/458; 428/413; 428/415; 428/417
(58) Field of Search ................. 428/343, 354, 428/355 EP, 317.3, 317.7, 317.5, 328.8, 314.4, 319.3, 426, 430, 457, 458, 413, 415, 417

(56) References Cited

U.S. PATENT DOCUMENTS

| | | | |
|---|---|---|---|
| RE24,906 E | 12/1960 | Ulrich | |
| 3,018,262 A | 1/1962 | Schroeder | |
| 3,117,099 A | 1/1964 | Proops et al. | |

(List continued on next page.)

FOREIGN PATENT DOCUMENTS

| | | |
|---|---|---|
| BE | 890747 | 4/1982 |
| CA | 879910 | 8/1971 |
| CA | 2073092 | 4/1993 |
| DE | 36 38 449 A1 | 5/1988 |
| EP | 0 128 837 | 12/1984 |
| EP | 0 163 194 | 12/1985 |
| EP | 0 163 195 | 12/1985 |
| EP | 0 262 831 | 4/1988 |
| EP | 0 384 598 | 5/1990 |
| EP | 0 377 376 | 7/1990 |
| EP | 0 382 602 | 8/1990 |
| EP | 0 392 090 | 10/1990 |
| EP | 0 402 254 | 12/1990 |
| EP | 0 665 250 | 8/1995 |
| EP | 0 798 354 | 10/1997 |
| EP | 0 881 066 | 12/1998 |
| FR | 2173318 | 2/1973 |
| FR | 2201184 | 4/1974 |
| GB | 2086263 | 5/1982 |
| JP | 07278507 | 10/1995 |
| JP | 08157781 A | 6/1996 |
| JP | 08157782 A | 8/1996 |
| JP | 08309863 | 11/1996 |
| JP | 08319462 | 12/1996 |
| JP | 08319463 | 12/1996 |
| WO | WO 94/18255 | 8/1994 |
| WO | WO 99/16618 | 4/1999 |

OTHER PUBLICATIONS

09/409,520, filed Sep. 30, 2000, by Clayton A. George and Michael A. Johnson.

*Primary Examiner*—Daniel Zirker
*Assistant Examiner*—Victor S. Chang
(74) *Attorney, Agent, or Firm*—Jean A. Lown; Harold C. Knecht, III; Brian E. Szymanski (57) ABSTRACT

A multi-layered article for establishing a seal between two substrates. The multi-layered article includes a bulk layer and an adhesive layer. The layers of the article are generally epoxy-containing, photo-activated materials. Upon photo activation, the bulk layer and the adhesive layer have different curing rates. The article is suitable for adhering and sealing two substrates together. The article is particularly useful when at least one of the substrates is glass.

20 Claims, 1 Drawing Sheet

U.S. PATENT DOCUMENTS

| | | |
|---|---|---|
| 3,493,418 A | 2/1970 | Amano |
| 3,542,619 A | 11/1970 | McManus |
| 3,574,024 A | 4/1971 | Rose |
| 3,645,817 A | 2/1972 | Walker et al. |
| 3,654,005 A | 4/1972 | Higgins et al. |
| 3,659,896 A | 5/1972 | Smith et al. |
| 3,704,196 A | 11/1972 | Callan |
| 3,755,066 A | 8/1973 | Rose |
| 3,756,881 A | 9/1973 | Denman |
| 3,767,503 A | 10/1973 | Maddalena |
| 3,787,351 A | 1/1974 | Olson |
| 3,816,234 A | 6/1974 | Winfield |
| 3,879,241 A | 4/1975 | Butler |
| 3,993,833 A | 11/1976 | Esmay |
| 4,069,364 A | 1/1978 | Dickie et al. |
| 4,112,171 A | 9/1978 | Motter et al. |
| 4,115,609 A | 9/1978 | Denman |
| 4,133,575 A | 1/1979 | Mäder |
| 4,176,212 A | 11/1979 | Brack |
| 4,181,752 A | 1/1980 | Martens et al. |
| 4,184,000 A | 1/1980 | Denman |
| 4,223,067 A | 9/1980 | Levens |
| 4,250,053 A | 2/1981 | Smith |
| 4,374,880 A | 2/1983 | Mesnel |
| 4,395,301 A | 7/1983 | Bauer |
| 4,401,537 A | 8/1983 | Chern et al. |
| 4,415,615 A | 11/1983 | Esmay et al. |
| 4,525,232 A | 6/1985 | Rooney et al. |
| 4,554,174 A | 11/1985 | Ohta et al. |
| 4,560,579 A | 12/1985 | Siadat et al. |
| 4,595,635 A | 6/1986 | Dubrow et al. |
| 4,599,274 A | 7/1986 | Ando et al. |
| 4,645,146 A | 2/1987 | Hall |
| 4,717,605 A | 1/1988 | Urban et al. |
| 4,748,061 A | 5/1988 | Vesley |
| 4,778,253 A | 10/1988 | Siga et al. |
| 4,867,826 A | 9/1989 | Wayte |
| 4,879,853 A | 11/1989 | Braendle et al. |
| 4,882,001 A | 11/1989 | González et al. |
| 4,894,259 A | 1/1990 | Kuller |
| 4,895,738 A | 1/1990 | Zimmerman et al. |
| 4,902,578 A | 2/1990 | Kerr, III |
| 4,908,273 A | 3/1990 | Urech et al. |
| 4,933,032 A | 6/1990 | Kunert |
| 4,964,362 A | 10/1990 | Dominguez |
| 4,986,867 A | 1/1991 | Braendle et al. |
| 4,994,315 A | 2/1991 | Schreiber et al. |
| 5,017,653 A | 5/1991 | Johnston |
| 5,040,844 A | 8/1991 | Stolz et al. |
| 5,049,439 A | 9/1991 | Robinson |
| 5,061,332 A | 10/1991 | Stolz et al. |
| 5,064,494 A | 11/1991 | Duck et al. |
| 5,082,736 A | 1/1992 | Bravet et al. |
| 5,086,088 A | 2/1992 | Kitano et al. |
| 5,089,076 A | 2/1992 | Leach et al. |
| 5,089,536 A | 2/1992 | Palazzotto |
| 5,120,379 A | 6/1992 | Noda et al. |
| 5,137,770 A * | 8/1992 | Rothe et al. ................ 428/192 |
| 5,212,271 A | 5/1993 | Beckett et al. |
| 5,252,694 A | 10/1993 | Willett et al. |
| 5,264,058 A | 11/1993 | Hoagland et al. |
| 5,304,623 A | 4/1994 | Ito et al. |
| 5,336,349 A | 8/1994 | Cornils et al. |
| 5,407,978 A | 4/1995 | Bymark et al. |
| 5,421,940 A | 6/1995 | Cornils et al. |
| 5,425,970 A | 6/1995 | Lahrmann et al. |
| 5,472,168 A | 12/1995 | Tapp |
| 5,486,257 A | 1/1996 | Onishi |
| 5,494,707 A | 2/1996 | Wang et al. |
| 5,496,598 A | 3/1996 | Delisle et al. |
| 5,510,152 A | 4/1996 | Boldt |
| 5,522,636 A | 6/1996 | Kolar, Jr. |
| 5,557,843 A | 9/1996 | McKenney et al. ........... 29/851 |
| 5,584,800 A | 12/1996 | Scholz et al. |
| 5,610,243 A | 3/1997 | Vietti et al. |
| 5,620,794 A | 4/1997 | Burkart et al. |
| 5,665,823 A | 9/1997 | Saxena et al. |
| 5,890,289 A | 4/1999 | Guillemet |
| 6,284,360 B1 * | 9/2001 | Johnson et al. .......... 428/317.7 |
| 6,316,099 B1 * | 11/2001 | George et al. ........ 428/355 EP |

* cited by examiner

MULTI-LAYERED SEALANT

This is a divisional of U.S. patent application Ser. No. 09/409,520 filed Sep. 30, 1999, now U.S. Pat. No. 6,316,099, which is a continuation of application Ser. No. PCT/US99/07195 filed Mar. 31, 1999, both of which are herein incorperated by reference.

FIELD OF THE INVENTION

The present invention relates to an article for establishing a seal between two substrates, more particularly to such an article having a plurality of layers, and even more particularly to such an article having a plurality of sealant layers with an outer adhesive layer having a different curing rate than the remaining layers.

BACKGROUND OF THE INVENTION

This invention relates to establishing a seal between two substrates. When attaching two substrates to each other, it is often important to provide an adhesive or sealant that sufficiently wets over the bonding surface, prior to bond formation. The degree of wet-out over the contact surface typically impacts the bond strength. The integrity of the seal can depend upon the proper adhesive strength and the cuing properties of the adhesive used in forming the seal. An appropriate surface contact between the adhesive and the substrate will enable a strong seal between the two substrates and thus prevent leakage through the bond line.

The integrity of the seal is particularly important where at least one of the substrates is glass. Many applications exist where it is necessary to secure a glass substrate within a frame such as a metal, plastic or wood frame, which may be painted. For example, a glass windshield or glazing is secured within the metal or plastic frame of a motor vehicle both during vehicle manufacture and during the replacement of damaged windshields on motor vehicles.

Polyurethane pastes are conventionally used to establish a seal between the primed glass and the frame. Such pastes, however, are difficult to apply uniformly and reproducibly. Additionally, such materials involve the undesirable use of wet chemistry, or solvent-based compounds, at the point of application. Another problem is that pushing the glass into the frame causes the paste to flow and squeeze out of the bond line. This creates bond lines of uneven thickness and glass-frame contact points that can act as failure points because any stress applied to the frame is transmitted directly to the glass at these points.

Another problem is encountered in the case of polyurethane sealant pastes that require a relatively long time to cure and build bond strength such as those which are moisture curable. During this vulnerable curing period, the glass can vibrate within the fame, making the seal and the glass susceptible to damage. Gaps in the seal can form, giving use to wind noise and compromising seal integrity. The noise associated with the vibrations is also undesirable. Moreover, the reliance on ambient moisture means that the cure process varies depending upon ambient conditions.

Thus, there is a need for a sealant that does not exhibit the above-described problems.

SUMMARY OF THE INVENTION

The invention features a multi-layered sealant for use in establishing an adhesive bond between two substrates. The article includes a photo-activated, epoxy-containing bulk layer. The bulk layer has a first major surface on which is bonded an adhesive layer. The adhesive layer is also a photo-activated, epoxy-containing material. Upon photo-activation, the at least one bulk layer has a different curing rate than the adhesive layer.

The difference in curing rate for the adhesive layer and the bulk layer is accomplished by adjusting the formulation of the compositions, the thicknesses of the layers, the activation parameters, the cure kinetics, or combinations therefore. The curing rate is measured through conventional techniques, such as thermal analysis, chemical analysis, and spectroscopy analysis.

The difference in curing rate is adjusted to accomplish an improved adhesion to substrates over single layer sealant compositions. The individual layers can be formulated to obtain improved wet-out onto the contact surface of the substrate and still obtain strong adhesive properties over a relatively short period of time.

Optionally, the multi-layered article of the present invention can include other layers applied onto a second major surface of the bulk layer. These optional layers are applied onto the bulk layer on a surface opposite the adhesive layer. The optional layers are application dependent and can serve as spacers, insulating layers, or bonding layers.

It is an advantage to provide an article that utilizes solid materials to form a seal between substrates. A solid article eliminates the use of wet chemicals and the material handling issues associated with them. It is also an advantage to utilize a sealant composition that provides sufficient wet out while quickly building adhesive strength over time. The ability to wet-out enhances the adhesion after complete cure of the polymeric material. The ability to build adhesive strength over a short period of time enables the use of the sealant in time demanding applications, such as, for example, the installation of the windshield in a motor vehicle.

For purposes of the present invention, the following terms used in this application are defined as follows:

"photo-activation" means application of sufficient actinic energy to initiate the polymerization or cure;

"initiator" and "catalyst" are used interchangeably and mean a material that can change the speed of a chemical reaction;

"cationically curable monomer or resin" means at least one epoxide containing material;

"polymerizable composition" or "curable composition" as used herein means a mixture of the initiator system and the cationically curable monomer; polyols and adjuvants optionally can be present;

"polymerize" or "cure" means to supply sufficient energy to a composition in the form of at least actinic energy to alter the physical state of the composition, to make it transform from a fluid to less fluid state, to go from a tacky to a non-tacky state, to go from a soluble to insoluble state, or to decrease the amount of polymerizable material by its consumption in a chemical reaction;

"Photo-initiator" or "initiator system" means being capable of initiating polymerization;

"cure rate" means the time elapsed from initial activation to cessation of further consumption of epoxy at a given temperature;

"accelerator" means at least one of a specified class of compounds that moderate the cure of a composition of the invention;

epoxy-containing" means a material comprising at least one epoxy and can further comprise accelerating additives, stabilizing additives, plastic fillers, polyols, thermo-plastic inhibitors and other additives;

"sensitizers" mean compositions that broaden the spectral response of photosensitive compositions;

"green strength" means initial holding power of the polymeric article to a substrate either before or after initial curing; and "wet-out" means the ability of the adhesive to spread out over and bond to the contact surface prior to reaching a cured state.

Other features and advantages will be apparent from the following description of the preferred embodiments thereof, and from the claims.

BRIEF DESCRIPTION OF THE DRAWINGS

The invention will be more fully appreciated with reference to the following drawings in which similar reference numerals designate like or analogous components throughout and in which.

DETAILED DESCRIPTION

Figure 1:
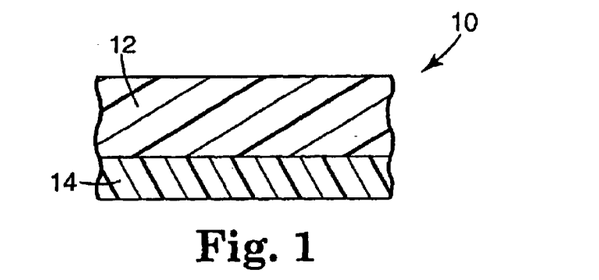
FIG. 1 is an enlarged, fragmentary, cross-sectional view of a multi-layer article according to the invention.

The article of the present invention, depicted in FIG. 1, is generally a multi-layered article 10 having a bulk layer 12 and an adhesive layer 14. The layers of the article are generally epoxy-containing, photo-activated materials. Upon photo-activation, the bulk layer 12 and the adhesive layer 14 have different curing rates. The article may optionally include other layers bonded to the bulk layer, for example, additional bulk layers, adhesive layers, insulating layers, core layers, tie layers, or combinations thereof may be utilized with the article of the present invention. The article of the present invention is suitable for adhering and sealing two substrates together. The article is particularly useful when at least one of the substrates is glass.

The article of the present invention is an improvement over a single layer sealant composition and liquid based sealants. The sealing of certain substrates requires that the sealant layer have some degree of thickness to serve as a filler for irregular surfaces between the substrates. Additionally, the sealant compositions are generally thermoset polymers, which require activation energy to initiate curing of the polymer. The activation source is generally in the form of actinic energy. In order to ensure polymerization of the composition throughout the relatively thick layer, a specific amount of energy is required over time. When the composition is activated prior to application onto a substrate, the polymeric material closest to the activation source will be exposed to more radiant energy and therefore may begin to gel causing the outermost layer to solidify or sin-over. The gelling of the exposed surface has a negative impact upon the ability of the polymer to wet-out on the surface of the substrate. The inability to properly wet-out adversely affects the adherence of the polymer on the substrate.

The multi-layered article for establishing a seal between substrates is an improvement over single layered sealant compositions. The utilization of an adhesive layer having a different cure rate from the bulk layer, enables one skilled in the art to tailor the adhesive layer to create a bond prior to gelling of the polymeric material while maintaining desirable bulk properties. In certain cases, it is necessary to have an adhesive layer that cures at a slower rate than the bulk layer in order to prevent gelling of the polymeric material at the surface and therefore improve the strength of the bond. An adhesive layer with a slower cure than the bulk layer is ideally suited for applications where actinic energy is applied from the exposed surface of the adhesive source.

The multi-layered sealant of the present invention includes a bulk layer. The bulk layers present in the multi-layered article are epoxy-containing compositions that are photo-activated. The bulk layer can contain several layers of epoxy-containing compositions. The layers generally have a different curing rate than the adhesive layer. The bulk layer has a first major surface and a second major surface. The first major surface is utilized as a bonding surface for the adhesive layer of the present inventive article. The second major surface provides a contacting surface for other layers or substrates. For example, a core layer may bonded to the second major surface of the bulk layer.

Additionally, the bulk layer is preferably designed to build cohesive strength rapidly, resulting in a construction having good green strength. One measure of the rate at which strength builds is the overlap shear adhesion of the sealant layer, as measured according to the test procedure described in the "Examples" section below.

In accordance with the invention, the adhesive layer is defined as the outermost layer of the article. The adhesive layer is an epoxy-containing polymer composition that is photo-activated. The cure rate of the adhesive layer is different than the cure rate of the bulk layer. Additionally, the adhesive layer has an exposed outer surface that is capable of adhering to the contacting surface of a substrate. Since the adhesive layer serves as the primary adhesion layer of the substrate, it must provide sufficient ability to wet-out on the substrate prior to forming a bond to the substrate. Sufficient wet-out and contact with the substrate will result in excellent adhesion properties, as indicated by the peel adhesion test provided in the following "examples" section.

In general, the layers of the invention are suitably thick to provide gap-filling between two substrates and to provide adequate adhesion properties. The thickness of the multi-layered article is application dependent. However, in certain applications, the total thickness of the multi-layered article is generally within the range of about 0.5 mm to about 17 mm. Preferably, the thickness of the multi-layered article is about 1 mm to about 15 mm, and most preferably, from about 2 mm to about 12 mm. The thickness of the adhesive layer is in the range of about 0.0125 mm to about 0.25 mm, preferably 0.025 to about 0.2, and most preferably about 0.075 to about 0.15. The bulk layer would make up the difference to achieve the desired total thickness of the multi-layered article.

The present invention relies upon the difference in curing rates between the adhesive layer and the bulk layer in order to achieve an article suitable for establishing a seal between two substrates. The curing rate is utilized to achieve a different level of performance for each layer. For example, with an article activated from the exposed surface of the adhesive layer, it would be desirable to use an adhesive layer with a slower reaction rate than the bulk layer. The slower reaction rate of the adhesive layer would prevent gelling of the surface material. Additionally, the longer exposure time would ensure activation of the material in the bulk layer and therefore enable complete cure of the article throughout the relatively thicker bulk layer.

In a preferred embodiment, the epoxy-containing material at the outer exposed surface of the adhesive layer has a cure rate that is equal to or slower than the cure rate of the epoxy-containing material at the second major surface of the bulk layer. The particular embodiment ensures that adequate wet-out of the contact surface between the adhesive layer and a substrate while also obtaining a desired level of cohesive strength in the bulk layer.

The difference in curing rate for the epoxy-containing compositions of the present invention is generally measured through chemical analysis, thermal analysis or spectroscopy analysis. Thermal analysis would include, for example, differential scanning calorimetry, or thermal mechanical analysis. The use of such techniques to measure the curing rate would include, for example, the use of differential scanning calorimetry to determine the time to achieve the disappearance of an exotherm for each of the epoxy based layers of the present invention. Examples of suitable chemical analysis techniques would include equivalent weight determination, gas chromatography, gel permeation chromatography, and separation techniques Spectroscopy analysis would include, for example, infrared spectroscopy and nuclear magnetic resonance spectroscopy. Those skilled in the art are capable of utilizing one or more techniques generally classified as chemical, thermal, or spectroscopy analysis to determine a difference in curing rates for the individual layers of the multi-layered article.

In accordance with the present invention, the curing rate of the epoxy-containing, photo-activated compositions is affected in several ways. For example, the curing rate for the adhesive layer and the bulk layer can be differentiated through the selection of the type of epoxy, the thickness of each layer, the activation source, components within the epoxy-containing compositions, cure kinetics, or combinations thereof. The components within the composition that are capable of affecting the curing rate would include photo-initiators, accelerators, inhibitors, and sensitizers. Other factors that affect the curing rate include the concentration of photo-initiators, the absorption wavelength of photo-initiators, the extinction coefficient of photo-initiators or sensitizers, and the presence of epoxy-type accelerators. Those skilled in the art are capable of selecting and optimizing one or more of the noted means for adjusting the curing rate in order to obtain the article of the present invention.

The compositions of the present invention utilize at least one epoxy-containing compound. The epoxy compound is generally a photo-activated epoxy-containing monomer or resin that is either mono-functional or multi-functional. The thermosettable epoxy compounds are cured or polymerized by cationic polymerization. The epoxy-containing monomer can also contain other epoxies compounds or blends of epoxy containing monomers with thermoplastic materials. The epoxy-containing monomer may be blended with specific materials to enhance the end use or application of the cured composition. Those skilled in the art recognize that the difference in curing rate for the adhesive layer and the bulk layer may be achieved through the selection of specific epoxy compounds for the noted layers.

Useful epoxy-containing materials are epoxy resins having at least one oxirane ring polymerizable by a ring opening reaction. Such materials, broadly called epoxides, include both monomeric and polymeric epoxides and can be aliphatic, cycloaliphatic, aromatic, or combinations thereof. Preferably, different types of epoxy-containing materials are utilized for the different layers in order to obtain the positive benefits of using multi-layers having different curing rates.

For example, the use of an aromatic epoxy in the adhesive layer and cycloaliphatic epoxy in the bulk layer would be a preferred combination that would result in the improved properties of the present invention. These materials generally have, on the average, at least two epoxy groups per molecule (preferably more than two epoxy groups per molecule). The "average" number of epoxy groups per molecule is defined as the number of epoxy groups in the epoxy-containing material divided by the total number of epoxy molecules present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference may be made to U.S. Pat. No. 3,117,099.

The epoxy-containing monomer or resin is preferably blended with one or more thermoplastic materials such as, for example, polyesters, vinyl acetates, ethyl vinyl acetates, polyacrylates, and polycaprolactones. An example of a useful blend is an epoxy-polyester blends described in U.S. patent application entitled "Melt-Flowable Materials and Method of Sealing Surface," filed Apr. 12, 1995 and bearing Ser. No. 08/421,055, incorporated by reference herein. These compositions are melt-flowable (and thus thermoformable) in the uncured state. They feature an epoxy-containing material blended with a semi-crystalline polyester resin. The epoxy-containing material contributes to the ultimate strength and heat resistance of the composition, while the polyester component provides conformability and pliability. The utilization of epoxy-containing based materials with polyester blends is also disclosed in U.S. patent application entitled "Sealant Compositions, Article Including Same, and Method of Using Same" filed on Sep. 30, 1997 and bearing Ser. No. 08/941,430, now U.S. Pat. No. 6,284,360, incorporated by reference herein. An example of ethyl vinyl acetates includes those disclosed in U.S. patent application entitled "Epoxy/Thermoplastic Photocurable Adhesive Compositions" filed May 1, 1998 and bearing Ser. No. 09/070,971, now U.S. Pat. No. 6,057,382, incorporated by reference herein.

Further epoxy-containing materials which are particularly useful in the sealant of the present invention are glycidyl ether monomers such as glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol) propane). Further examples of epoxides of this type which can be used in the practice of this invention are described in U.S. Pat. No. 3,018,262. Other useful glycidyl ether based epoxy-containing materials are described in U.S. Pat. No. 5,407,978.

Bifunctional monomers may also be used and examples that are useful in this invention possess at least one cationically polymerizable functionality or a functionality that copolymerizes with cationically polymerzable monomers, e.g, functionalities that will allow an epoxy-alcohol copolymerization.

Other materials that can be incorporated into the sealant layers include, for example, stabilizers, antioxidants, plasticizers, tackfiers, flow control agents, adhesion promoters (e.g., silanes and titanates), colorants, and other fillers.

The curing rate of each of the adhesive layer and the bulk layer can be adjusted through the selection of specific photo-initiators, sensitizers, accelerators, or combinations thereof Those skilled in the art recognize that the rate of absorption of actinic energy will affect the curing rate of the adhesive layer and the bulk layer. The absorption of actinic energy by a photo-initiator or sensitizer is related to the amount of incident light that is transmitted through a material and can be expressed by the equation:

Absorption=($\epsilon$) $cl$ (Beer's Law, wherein, A is the absorption, e is the extinction coefficient of the absorbing species, C is the concentration of the absorbing species, and L is the path length or thickness of the material.

Ideally, it is desirable to absorb all the light to make efficient use of the radiation source. However, the light must pass through the entire thickness to ensure activation (or generation of catalyst) at the surface furthest away from the source. Those skilled in the art recognize that in order to control and maximize the light penetration it is necessary to adjust the concentration of the absorbing species, such as the sensitizer, the photo-initiator, or both. Alternatively, one can select different photosensitizers with different extinction coefficients to adjust the light penetration.

The noted equation also applies to multi-layered systems, which can be expressed as:

$A_{(total)} = \epsilon_1 C_1 I_1 + \epsilon_2 C_2 I_2 + \ldots \epsilon_i C_i I_i$.

Those skilled in the art recognize that combinations of sensitizers and photo-initiators can be utilized to maximize the depth of cure. For example, in the present invention, the selection of a photo-initiator concentration or an extinction coefficient to control the amount of light being absorbed by each layer.

Additionally, since emission of light sources is generally not monochromatic, the efficiency of the system and ability to control the depth of cure is dependent on how the absorption characteristics of the sensitizer, the photo-initiator, or both match with the emission characteristics of a given light source.

Useful photo-initiators are cationic and include aromatic iodonium complex salts, aromatic sulfonium complex salts, and metallocene salts, and are described in, for example, U.S. Pat. No. 5,089,536 (Palazzotto). Peroxides and oxalate esters can be used with the metallocene salts to increase the cure speed, as described in U.S. Pat. No. 5,252,694 (Willett). Useful commercially available photo-active curing agents include FX-512, an aromatic sulfonium complex salt (3M Company), CD-1010 an aromatic sulfonium complex salt from Sartomer, CD-1012, a diaryliodonium complex salt from Sartomer, an aromatic sulfonium complex salt (Union Carbide Corp.), UVI-6974, an aromatic sulfonium complex salt (Union Carbide Corp.), and IRGACURE 261, a metallocene complex salt (Ciba-Geigy).

Photosensitizers can also be included, for example, to enhance the efficiency of the photo-active curing agent, to adjust the wavelength of photoactivity, or both Examples of photosensitizers include pyrene, fluoroanthrene, benzil, 1,3-diphenyl isobenzofuran, chrysene, p-terphenyl, acenaphthene, phenanthrene, biphenyl and camphorquinone. Additionally, the fluorescent polyaryl compounds disclosed in U.S. Pat. No. 4,250,053, herein incorporated by reference in its entirety, are suitable for use in the epoxy-containing compositions of the present invention.

Selecting a photoinitiation system that is capable of photobleaching is an important consideration in trying to achieve a balanced cure profile in thick layers. Photobleaching is a property where a chemical entity is able to absorb light at a particular wavelength and decompose. Decomposition results in a change in the light absorption characteristics of the decomposition products which allows light at the preferred wavelength to penetrate further into the sample being that there is no longer a material present that can absorb the preferred wavelength of light. Materials that display this particular property include photosensitizers such as camphorquinone and 1,3-diphenyl isobenzofuran as well as photoinitiators such as the iron metallocenes.

In certain cases, it may be advantageous to add an accelerator to the composition. An accelerator added to one or both of the adhesive layers and the bulk layer can affect the curing rate and thereby achieve the desirable results of the present invention. Dihydroxy aromatics, such as those disclosed in U.S. patent application Ser. No. 09/224,421 filed Dec. 31, 1998, now U.S. Pat. No. 6,133,335, herein incorporated by reference in its entirety, are suitable for use in the present invention.

Chemical inhibitors can also be included in the adhesive or bulk sealing layers as a means of adjusting the chemical kinetics of the polymerization reaction. Inhibitors in this invention function through an acid base interaction which can delay the cationically induced polymerization of the epoxy functionality in the formulation. Typical inhibitors that are useful in this invention include amines, such as, ethyl-ortho-dimethyl amino benzoate and organometallics such as tin chloride.

Figure 2:
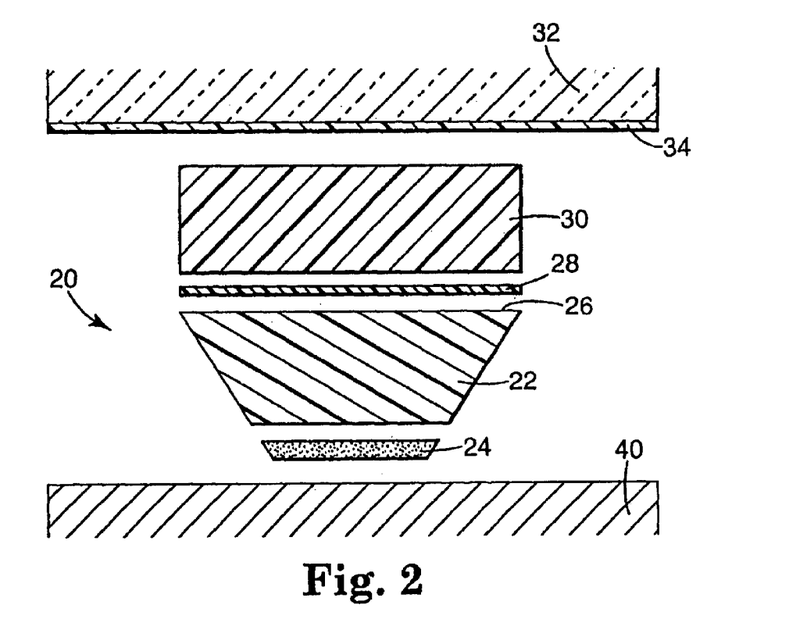
FIG. 2 is an exploded perspective view of a another multi-layered article according to the invention.

The article of the present invention can optionally include other layers of materials bonded to the second major surface of the bulk layer. FIG. 2 depicts one possible embodiment utilizing the multi-layered sealant composition of the present invention. The multi-layered sealant 20, having a bulk layer 22 and an adhesive layer 24, is shown in an exploded view between two substrates 32 and 40, respectively. An optional tie layer 28 is used to bond a core layer 30 to a major surface 26 of the bulk layer 22. A bonding layer 34 can be applied onto the substrate 32, as indicated in FIG. 2, or can be integrally provided on the surface of the core layer 30.

The bulk layer 22 and adhesive layer 24 are depicted in FIG. 2 in a trapezoidal configuration. This particular configuration enables control of the path length and level of actinic energy required for activating as the actinic energy is applied from a direction normal to the exposed surface of the adhesive layer 24.

There are several reason for applying a core onto a surface of the bulk layer. One purpose of the core layer is to act as an integral spacer when the multi-layered sealant is used to establish a seal between a pair of substrates. Thus, during pressurized application of the sealant to the other substrate, the core layer prevents the two substrates from coming together in the event that the sealant is displaced. Such contact is particularly undesirable where one of the substrates is glass because the resulting stress can cause the glass to break. The core layer also dissipates stress resulting from cure of the sealant, thereby minimizing stress in the seal.

The core layer also preferably acts as an internal vibration damper to minimize noise associated with variable frequency substrate movement once the two substrates have been sealed together. The core layer also isolates the substrate to which it is affixed from stresses transmitted to that substrate and from the other substrate. For example, in the case of a glass windshield installed in a motor vehicle, the core layer damps vibrations arising from wind impinging on the glass, as well as vibrations arising from the motor vehicle frame.

Another function of the core layer is to thermally insulate the multi-layered sealant from the bonding layer, regardless of whether the bonding layer is integral with the article of the present invention, or applied separately to the substrate surface prior to application of the tape. In this way, the respective curing reactions that may take place in the sealant and bonding layers can be isolated from each other, affording the opportunity to cure the layers in stages. It also offers the advantage of increasing formulation freedom with respect to the compositions of the sealant and bonding layers.

Yet another function of the core layer is to act as a failure zone such that cohesive failure of the article preferentially occurs in the core layer, rather than the multi-layered sealant or the bonding layer (if present). This feature is particularly advantageous when bonding glass substrates such as windshields to a metal or plastic frame in a motor vehicle because it ensures that adhesive bonds between the glass and the tape, and between the tape and vehicle, remain intact when subject to stress, thereby enhancing overall performance.

To achieve these functions the core layer is designed to be compressible and conformable. These features enable the core layer, for example, to cushion the substrate to which the article is affixed, and to absorb and distribute stress applied to the sealed construction. In addition, compressibility and conformability aid in achieving complete body contact and seal formation. Additionally, the core layer is also designed to be melt-flow resistant such that it does not undergo macroscopic mass flow when exposed to the temperatures and pressures used during the sealing operation.

To promote cohesive failure, the core layer is preferably formulated to be weaker than either the multi-layered sealant or the bonding layer (if present). That is, the ultimate tensile strength of the core layer is no greater than the ultimate tensile strength of either the sealant layer or the bonding layer (if present) so as to encourage cohesive failure within the core layer.

The thickness of the core layer must be sufficient for the core layer to perform the bond line spacing function and, preferably, the vibration damping and thermal insulation functions as well. The particular thickness of a given core layer is selected based upon the application for which the multi-layered sealant is intended. Typically, the thickness of the core layer is at least about 1 mm, preferably at least about 2 mm, and more preferably at least about 3 mm.

Preferred materials for the core layer are viscoelastic materials. These materials may be thermoplastic or thermoset, with thermoset materials being preferred. Examples of suitable materials for the core layer include thermoset materials such as polyacrylates and polyurethanes, and thermoplastic materials such as ethylene vinyl acetate copolymers. Also suitable are pressure sensitive adhesives which permit the bonding of the core layer directly to the substrate, thereby eliminating the need for a separate bonding layer (integral or otherwise).

Other materials that can be incorporated into core layer 14 include, for example, stabilizers, antioxidants, plasticizers, tackifiers, flow control agents, adhesion promoters (e.g., silanes and titanates), colorants, thixotropes, and other filters.

The optional tie layer, disposed between the bulk layer and the core layer, is used to further localize cohesive failure in the core layer. A second tie layer may be similarly disposed between the core layer and the bonding layer (if present). Useful materials for the tie layer include, for example, polymeric films, pressure-sensitive adhesives, pressure-activated adhesives, heat activated adhesives, and the like, any of which may be latently curable or not. Often, the choice of tie layer is based upon the composition of the respectve layers.

The bonding layer is preferably in the form of a continuous layer. The width of bonding layer is application-dependent. In general, however, the width of bonding layer is preferably no greater than the width of core layer. In addition, both single and multi-layer bonding compositions are envisioned. The purpose of bonding layer is to enhance adhesion between the substrate and core layer. It is particularly useful when the substrate is glass.

Suitable materials for the bonding layer are tacky at the installation temperature. Both thermoplastic and thermosetting materials may be used. The bonding layer is ordinarily selected so as to have, as compared to the multi-layered sealant, a different composition, thickness or both. The choice of a particular material for the bonding layer depends on the substrate.

Thermosetting materials may incorporate a photo-active curing agent. Preferably, the bonding layer cures under conditions different from the conditions under which the multi-layered sealant cures. For example, if both multi-layered sealant layer and bonding layer are photo-curable materials, the wavelength of radiation needed to initiate cure of the multi-layered sealant differs from that needed to initiate cure of the bonding layer.

Examples of suitable materials for bonding layer include epoxy/polyacrylate blends as described, e.g., in Kitano et al., U.S. Pat. No. 5,086,088; epoxy/amorphous polyester blends; polyolefin adhesives (e.g., polyethylene, polypropylene, polyhexene, polyoctene, and blends and copolymers thereof); ethylene-vinyl monomer (e.g., ethylene-vinyl acetate) copolymer adhesives; epoxy adhesives; silicone adhesives; silicone-acrylate adhesives; acrylic adhesives; rubber adhesives (e.g., butyl rubber); and adhesives based upon thermoplastic elastomer block copolymers (e.g., styrene-butadiene-styrene, styrene-isoprene-styrene, or styrene-ethylene-propylene-styrene block copolymers). These materials may be provided in film or bulk form, and may be supplied as hot melt materials. Depending upon the substrate to which the bonding layer will be adhered, the use of a primer may be advantageous in promoting adhesion.

Other materials that can be incorporated into bonding layer 16 include, for example, stabilizers antioxidants, plasticizers, tackifiers, flow control agents, adhesion promoters (e.g., silanes and titanates), colorants, thixotropes, and other fillers. Additionally, on optional protective liner may be applied onto the bonding layer.

In accordance with the present invention, the multi-layered sealant is generally provided in forms conventionally recognized in the art. The article can be provided in the form of a continuous layer. An example of a continuous form would be the formation of the multi-layered sealant, along with other optional layers, as a tape construction. However, discontinuous layers may also bemused as long as the multi-layered sealant fuses under the application of heat and pressure to form an effective seal in the final article.

The multi-layered article according to the invention may be readily prepared in many ways. For example, the ingredients for the sealant composition may be melted and stirred in a suitable mixing vessel (e.g., a batch mixer, an extruder, etc.) at an elevated temperature low enough to avoid decomposing any photo-active curing agent present in the sealant composition. After mixing, the sealant composition may be formed into its final shape by a variety of different methods. For example, the adhesive layer can be coated onto a release liner using a heated knife coater. The bulk layer can be applied over the adhesive layer. Alternatively, the sealant composition ingredients may be compounded in an extruder and then co-extruded through a die having a desired profile to produce a shaped strip of sealant; i.e., a strip having the desired cross-sectional shape. Other conventional techniques generally recognized in the art for forming a flat sheet of the multi-layered sealant composition may be suitable for use with the present invention.

Batch mixing techniques may also be employed in preparing the multi-layered sealant compositions used in the invention.

The optional core layer can also be prepared in many ways, depending on its composition. Methods suitable for use with the invention are disclosed in U.S. patent application Ser. No. 08/941,430, now U.S. Pat. No. 6,284,360, previously incorporated by reference.

The multi-layer articles of the invention may also be produced by laminating a previously prepared sealant layers, core layer and bonding layer (if provided). For example, the bonding layer and/or the sealant layer can be readily laminated to the core layer under the influence of pressure to produce a finished tape. When the core layer, sealant layer, and bonding layer are each made separately, adhesion between these layers may be enhanced through the use of primers or tie layers. The primer or tie layer can be applied by extrusion coating a compatible material onto either the sealant layer or the core layer, coating a primer onto either layer, optionally drying the primer or tie layer, and then pressing the layers together to form a multi-layer article according to the invention. Optionally, a separate adhesive layer may be used to bond a layer together.

The above-described article can be used to establish a seal between a variety of substrate. The substrates may be the same as, or different from, each other. Examples of suitable substrates include glass, metal, plastic, wood, and ceramic substrates. Representative plastic substrates include polyvinyl chloride, ethylene-propylene-diene monomer rubber, polyurethanes, polymethyl methacrylate, engineering thermoplastics (e.g., polyphenylene oxide, polyetheretherketone, polycaibonate), and thermoplastic elastomers, including thermoplastic elastomeric olefins. Glass, and polymers which may be used as substitutes for glass (e.g, polybarbonate and polymethyl methacrylate), may be referred to as glazing materials. The article is particularly effective in sealing substrates that have a higher surface energy (as measured by a Zisman critical wetting tension greater than 35 millijoules/m$^2$) such as metal, including painted or coated metal, and many polymers. The surface of the substrate may be coated, e.g., with paint, an abrasion-resistant coating, or an anti-glare coating. In the case of e.g., windshields, the glass may include a ceramic-frit layer.

In applying the photo-activated article between two substrates, generally a portion of the sealant, for example, the core layer is affixed to one substrate before photo-activation of the adhesive and the bulk layer. After a portion of the article is applied onto one substrate, the multi-layered sealant is heated e.g., by exposing it to infrared radiation, to the point where the sealant softens but does not flow. The temperature to which the sealant compositions are heated is dependent upon the compositions used in the article and the type of substrates utilized in the application. For example, the application of a windshield in a motor vehicle would limit the temperature to a point below the softening point of the polyvinyl butyral interlayer used in the laminate windshield.

The softening temperature of the sealant represents the minimum temperature at which the composition is sufficiently malleable such that it can be mounted to and held in place on a substrate. The softening temperature is a function of the particular sealant composition. In the case of crystalline or semi-crystalline component-containing sealing compositions, this generally corresponds to the melting temple of this component. Typically, the upper temperature limit is on the order of about 200° C.

Immediately after the initial heating step, the actinic energy is applied to the multi-layered sealant composition to initiate curing. The substrates are then placed together with the adhesive layer contacting the substrate. The curing rate of each layer is adjusted in accordance with the present invention to achieve a proper wet-out by the adhesive layer and curing of the bulk layer.

An alternative method for applying the multi-layered sealant would include the placement of the sealant between two substrates with the application of actinic energy applied after the article is in place between the substrates. This technique requires at least one substrate that is transparent to the specific form of actinic energy utilized. Additionally, this application technique may require that the bulk layer have a slower curing rate than the adhesive layer.

Preferred forms of actinic energy include visible light and ultraviolet light. The amount of radiation energy required to polymerize the composition varies depending upon the thickness and its chemical make-up, but typically ranges from about 200 to 2,000 milliJoules.

The multi-layered sealant of the present invention exhibits improved adhesion over conventional sealant compositions. The multi-layer article permits one skilled in the art to adjust compositions in each layer of the present invention to optimize the establishment of a seal between two substrates. A desired curing rate for the adhesive layer may be selected to achieve an appropriate bond at the contact surface of a substrate while the curing rate of the bulk layer is selected to obtain the desired cohesive strength.

Figure 3:
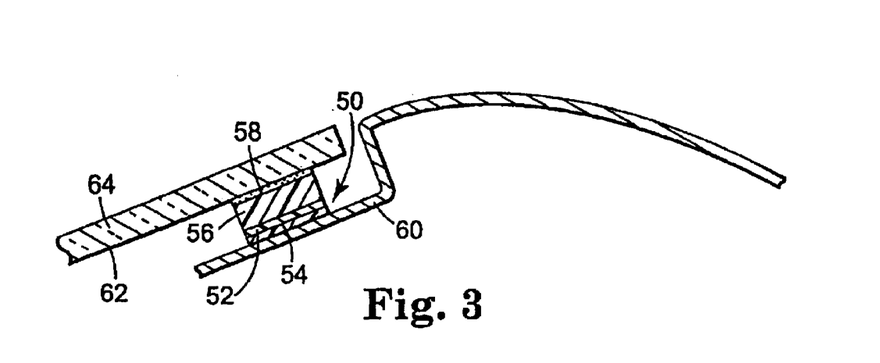
FIG. 3 is a schematic cross-sectional drawing showing, according to the invention, the use of a multi-layer tape to secure a windshield to a frame in a motor vehicle.

FIG. 3 is an illustration of an application of the multi-layered sealant layer of the present invention. The multi-layered sealant 50, having a bulk layer 52 and an adhesive layer 54, is applied between a metal frame 60 of a motor vehicle and the inner surface 62 of a windshield 64. The multi-layered sealant 50 also includes a core layer 56 and a bonding layer 58.

Although it is prerable to include the multi-layered sealant, core layer, and bonding layer in the form of a single integral tape, it is also possible to apply these materials separately, or in various combinations with each other, to the glass surface. For example, it is possible to apply a tape featuring the core layer and the bonding layer to the glass surface, followed by application of a separate multi-layered sealant. Alternatively, the bonding layer may be provided in the form of a primer applied to the glass surface, after which a tape (containing the multi-layered sealant and the core layer) is affixed to the primed surface.

The invention will now be described further by way of the following non-limiting examples.

EXAMPLES

Overlap Shear Test

A 0.127 mm thick anodized aluminum test coupon and a painted steel panel clear coated with DCT 5002 (obtained from Advanced Coating Technologies, Inc. of Hillsdale, Mich.), both 25.4 mm by 76.2 mm are used for the test. The clear coated surface is cleaned with 50% aqueous isopropanol. A 12.7 mm by 25.4 mm piece of the test sample (the adhesive layer, the bulk layer, an adhesive layer placed on top of a bulk layer, or any of the foregoing layers on a foam core) is attached flush to the narrow edge of the anodized aluminum coupon with the 12.7 dimension against the narrow edge. The sample is heated at 120° C. for 3 minutes, and photolyzed according to the procedure in Example 1. Immediately after photolyzing, the narrow edge of the painted steel panel is placed on top of the adhesive layer with the clear coated side on the adhesive, and with the non-adhesive coated ends of the panel and the coupon extending in opposite directions. The composite is pressed together with finger pressure and aged at 21° C. for 3 days. The composite is damped into the jaws of an Instron tensile testing apparatus using a crosshead speed of 50.8 mm/minute, and a jaw gap of 50.8 mm. The maximum force before breakage of the sample is measured and reported in kilopascals (kPa).

90° Peel Adhesion Test

A 12.7 mm by 101.6 mm strip of the test sample (the adhesive layer, the bulk layer, an adhesive layer placed on top of a bulk layer, or any of the foregoing layers on a foam core) is attached along the length of a 0.127 mm thick anodized aluminum test coupon, heated to 120° C. for 3 minutes, and photolyzed according to the procedure in Example 1. A clear coated steel panel (described for Overlap Shear Test) measuring 50.8 mm by 305 mm is cleaned with 50% aqueous isopropanol. Immediately after photolyzing, the clear coated surface of the painted steel panel is placed on top of the adhesive layer, with the non-adhesive coated ends of the panels extending in same directions. The composite is pressed together with light finger pressure and aged at 21° C. for 3 days. The steel panel is mounted in a fixture so that it is horizontal. The free end of the aluminum coupon is clamped into the upper jaw of an Instron Tensile Tester. The crosshead speed is 304.8/minute. The initial force required to start the peel test, which is also the maximum peel value, is reported as the Breakaway Peel Adhesion. The force levels value levels off and the average of after the breakaway peel adhesion is reported as the Continuous Peel Adhesion. Both values are calculated in pounds per half inch and reported in the examples in Newtons/decimeter (N/dm).

Example 1

A premix composition was prepared by mixing 50 grams of epoxy resin (diglycidyl ether of bisphenol A sold U Epon™828 by Shell Chemical Co) with 2 grams of Catalyst A, and heating at 121° C. for about 2 hours. Catalyst A is a metallocene catalyst designated Cp(Xylenes)Fe+SbF$_6$; wherein Cp=cyclopentadiene; also described as: (eta$^6$-xylenes)(eta$^5$-cyclopentadienyl)iron (1+) hexafluoroantimonate as disclosed in U.S. Pat. No. 5,089,536 (Palazzotto). Then 160 grams of polyester (Dynapol™S330 available from Creanova, Inc., Somerset, N.J.) were heated to 121° C. and combined with 40 grams of the premix and 2 grams of propyl gallate (available from Aldrich Chemicals), and mixed at 177° C.

The mixture was cooled to about 135° C. and pressed out between silicone coated polyester films to thicknesses of 1 mm, 1.5 mm, and 3 mm to form layers of material suitable for either the adhesive layer or the bulk layer. The samples were then cut in half. Half of each sample was then heated to 121° C. and photolyzed with actinic radiation from a V bulb in a Fusion Systems lamp system (Model No. F300S) at a speed of 12.2 meters/minute using a Fusion Systems Benchtop Conveyer (Model No. LC-6). The equipment was obtained from Fusion Systems Corp., Rockville, Md.).

Within about 4 hours of photolyzing, all of the samples were tested using near infrared spectroscopy on a Bomem MB Series spectrometer. The samples that had been exposed exhibited a lower absorbance at 2200 nm which is the epoxy absorbance area as compared to the unexposed samples. This indicated that some of the epoxy groups had reacted in the photolyzed samples. Spectra were taken at 24-hour intervals and indicated that approximately 80% of the curing had occurred within the four days after photolyzing. The spectra for all of the thicknesses were the same, which is an indication that the light had penetrated the samples sufficiently to initiate the cure of the epoxy throughout the entire thickness of each sample. The unexposed samples maintained a constant absorbance at 2200 nm indicating virtually no reaction of the epoxy groups.

Example 2

A premix composition was prepared by mixing 50 grams of epoxy resin (Epon™828) and 1 gram of an iodonium salt catalyst (CD-1012 available from Sartomer) and 0.2 gram of camphorquinone (available from Hampford Research) and heating to 121° C. until the catalyst dissolved. Then 160 grams of polyester (Dynapon™S330) were heated to 121° C., combined with 40.2 grams of the premix composition, and then mixed and heated to a temperature of 177° C. The mixture was then cooled to about 135° C. and pressed to thicknesses of 1 mm, 1.5 mm, and 3 mm to form layers of material suitable either for the bulk layer or the adhesive layer. The samples were cooled and cut in half. Half of the samples were photolyzed according to the procedure in Example 1.

Within 4 hours of photolyzing, the samples were tested using near infrared spectroscopy according to the procedure in Example 1. There was very little to no change in the difference spectra between the photolyzed samples and the unexposed samples over 4 days. This indicated that the photolyzed samples were almost completely cured within 4 hours of photolyzing.

Example 3

A multi-layered tape is prepared by coextruding a 0.127 mm thick film made from the composition of Example 1 with a 3 mm thick sheet made from the composition of Example 2. The tape, having a bulk layer with a curing rate greater than the curing rate of the adhesive layer, would exhibit the desired properties of the present invention.

Example 4

A foam core composition was prepared by mixing 90 parts isooctyl acrylate, 10 parts acrylic acid, and 0.04 parts of a photoinitiator (benzil dimethyl ketal available as lacure™T651 from Ciba Geigy). The mixture was exposed to low intensity ultraviolet radiation (described below) to a viscosity of about 2200 centipoise. Then an additional 0.10 part of benzil dimethyl ketal was added as well as 0.08 part 1,6-hexanedioldiacrylate, 6 parts K15 glass bubbles, and 1.5 parts of hydrophobic silica (Aerosil™R972 from DeGussa). The composition was mixed until it was uniform throughout, degassed, and then pumped into a 90 mm frother (available from E.T. Oakes, Hauppage, N.Y.) operating at about 300 to 350 rpm. Concurrently, and continuously, nitrogen, black pigment (PennColor 9B117), and approximately 1.5 parts of a 60/40 mixture of surfactant A/surfactant B were fed into the frother per 100 parts of the total composition. The nitrogen was controlled to provide the desired foam density. Surfactant A was $C_8F_{17}SO_2N(C_2H_5)(C_2H_4O)_7CH_3$ and surfactant B was a 50% solids solution in ethyl acetate of the fluoroaliphatic oligomer of Example 2 of U.S. Pat. No. 3,787,351. The black pigment was added in an amount to provide a finished product L value of about 32 as measured with a HunterLab calorimeter (Color 'L' calorimeter and a D25 Optical Sensor, both available from HunterLab Associates, Reston Va.).

The frothed mixture was delivered under a pressure of 205 kiloPascals to the nip of a roll coater to a thickness of about 1 mm between a pair of sheets of transparent, biaxially-oriented polyethylene terephthalate, the facing surfaces of which had release coatings, to produce a composite. The tubing was partially constricted by a clamp to provide the desired level of pressure in the frother. The composite emerging from the roll coater was irradiated from both the top and bottom with banks of Sylvania fluorescent black light bulbs, 90% of the emissions of which were between 300 and 400 nm, with a maximum of 351 nm. The composite was successively exposed to the bulbs at an intensity of 2.65 milliWatts/square centimeter ($mW/cm^2$) and a total energy of 165.4 millijoules per square centimeter ($mJ/cm^2$) each from the top and bottom, then likewise to an intensity of 2.70 $mW/cm^2$ and a total energy of 168.5 $mJ/cm^2$, and then likewise to an intensity of 5.90 $mW/cm^2$ and a total energy of 516.8 $mJ/cm^2$. Light measurements were measured in NIST units. The foam density was 0.6 grams/cc.

A tape is prepared by laminating the tape of Example 3 to the foam core. The foam core is first primed with an aqueous dispersion of Micromid 632 HP (available from Union Camp), dried at room temperature, and then heated at 120° C. for 10 minutes. The primed core is then cooled to room temperature. The tape of Example 3 can be pressed onto the core with the composition of Example 1 bonded to the foam core.

Examples 5–7

A bulk layer premix composition was prepared by mixing 25 parts of a cycloaliphatic epoxy (ERL-4221 available from Union Carbide), 0.25 part CD-1012 catalyst, and 0.05 part camphorquinone. The premix was fed to a twin screw extruder at a rate of 12.5 grams per minute. Concurrently, polyester (Dynapol S1402 available from Creanova, Inc.) was fed to the extruder at a rate of 37.6 grams per minute. The total formulation is shown in Table 1. The extruder is a 19 mm co-rotating twin screw extruder with a 25:1 L/D. The extruder temperatures were set as follows: Zone 1-60° C., Zone 2-90° C., Zone 3-100° C., Zone 4-115° C., Zone 5-120° C., and die-125° C. The bulk layer was extruded to a thickness of 3 mm onto a silicone coated polyester release liner.

Adhesive layers for Example 5, 6, and 7 were prepared using the compositions listed in parts shown in Table 1. The epoxy, Catalyst A, propyl gallate (available from Eastnan Chemicals), and caprolactone (available from Aldrich Chemicals) were mixed and then fed to the extruder at a flow rate of 12.5 grams/minute; the polyester was fed to the extruder at a flow rate of 37.5 grams/minute . Adhesive layers were extruded to a thickness of 0.127 mm according to the above procedure for the bulk layer. Each of the adhesive layers were laminated on the bulk layers and then cut into test samples for overlap shear and peel adhesion testing. The pieces were placed on anodized aluminum coupons and heated at 120° C. for about 3 minutes or until the surface starts to appear fluid.

The samples were then photolyzed using a V bulb in the Fusion Systems equipment described in Example 1 at a speed of 16.5 meters/minute. After photolyzing, the corners and edges of the adhesive layer were sharp, indicating that the bulk layer composition had cured sufficiently to prevent flow from occurring, while the adhesive layer was still noticeably fluid and capable of forming an adhesive bond with an adherend. The adhesive layer is thin relative to the bulk layer so the shape of the adhesive layer flows the shape of the bulk layer as viewed by the unaided eye. The photolyzed panels were then used to make test samples for overlap shear and peel adhesion as described above. Test results are shown in Table 1.

TABLE 1

| Materials (in parts) | Example 5 | Example 6 | Example 7 |
| --- | --- | --- | --- |
| Dynapol S1402 | 75 | 75 | 75 |
| Epon 828 | 25 | 25 | 25 |
| Catalyst A | 0.25 | 0.25 | 0.1 |
| Propyl gallate | | 1 | |
| Caprolactone | 0.25 | 0.25 | 0.1 |
| Test Results | | | |
| Overlap Shear Strength - kPa | 1126.6 | 1654.7 | 697.7 |
| Breakaway peel - N/dm | 1235 | 2178.6 | 381.8 |
| Continuous peel - N/dm | | 1232.9 | 252.2 |

The data in Table 1 illustrate the effect of varying the catalyst levels in the adhesive layer on peel adhesion and overlap shear strength. Example 7, having the lowest level of catalyst was the slowest to cure, while Example 6, having propyl gallate as an accelerator was the fastest to cure. The adhesion test values indicate that the fastest curing composition (Example 6) has greater adhesive strength than the slower curing compositions. The adhesive strength is impacted by the degree of curing in a specific composition. Therefore, the slower curing compositions in Examples 5 and 7 are not cured to the degree of Example 6, as indicated by lower adhesion test results.

Examples 8–11

An adhesive layer premix composition was prepared mixing 600 parts of Epon 828, 0.75 part Catalyst A, 6 parts of propyl gallate, and 0.75 part caprolactone, 0.75 part camphorquinone, and 0.75 part CD-1012 catalyst. The premix was fed to the extruder at a flow rate of 10 grams/minute and the polyester (Dynapol S330) was fed at a rate of 40 grams/minute. The extruder temperatures were set as follows: Zone 1-66° C., Zone 2-110° C., Zone 3-115° C., Zone 4-120° C. Zone 125° C., and die-132° C. The adhesive layer was extruded to a thickness of 0.127 mm onto a silicone coated polyester film.

Bulk layer premix compositions for Examples 8, 9, 10, and 11 were prepared by mixing the epoxy, Catalyst A, propyl gallate, caprolactone, camphorquinone, and CD-1012 catalyst in the amounts listed in Table 2. The premix was fed to the extruder at 10 grams/minute and concurrently, the polyester (Dynapol S330) was fed at a rate of 40 grams/minute. The temperatures were set as described for the adhesive layer.

The adhesive layers were placed on each of the bulk layers, cut into samples for testing, placed on anodized aluminum test coupons, and heated and photolyzed according to the procedure in Example 5. After photolyzing, the corners and edges of the adhesive layer remained sharp, indicating that the composition had cured sufficiently to prevent flow from occurring, while the adhesive layer was still noticeably fluid and capable of forming a bond with an adherend. The photolyzed panels were then used to make samples for overlap shear and peel adhesion as described above. Test results are shown in Table 2.

TABLE 2

| Materials (in parts) | Ex 8 | Ex 9 | Ex 10 | Ex 11 |
| --- | --- | --- | --- | --- |
| ERL-4221 epoxy | — | 600 | 300 | — |
| Epon 828 | 600 | — | 300 | 600 |
| Catalyst A | 0.75 | — | — | — |
| Propyl gallate | 6 | — | — | — |
| Caprolactone | 0.75 | — | — | — |
| Camphorquinone | 0.75 | 3 | 3 | 3 |
| CD-1012 catalyst | 0.75 | 6 | 6 | 6 |
| Test Results | | | | |
| Overlap Shear Strength - kPa | 2386 | 2344 | 1902 | 2013 |
| Breakaway peel - N/dm | 350 | 595 | 490 | 245 |
| Continuous peel - N/dm | 140 | 210 | 210 | 210 |

The data in Table 2 show the effect of changing the catalyst, Example 8 has a combination of catalysts, photosensitizer, and photo-initiator while Examples 9–11 have a combination of an iodonium salt catalyst and a photo-initiator. Additionally, the use of cycloaliphatic epoxy has a faster cure rate than an aromatic epoxy in Example 11 or the combination of aromatic and cycloaliphatic epoxy compositions in Example 10. The adhesion test results indicate that the faster curing epoxy-containing composition, generally give greater adhesion test values over slower curing compositions.

Examples 12–14

Bulk layers were prepared according to the procedure in Example 5 except that the compositions used were those shown in Table 3. The epoxy-catalyst-sensitizer compositions were provided to the extruder as a premix. Elvax 40W is an ethylene vinyl acetate available from DuPont Company. CA Resin is a polyaldehyde available from Creanova, Inc.

The adhesive layer of Example 8 was laminated to each of the bulk layers and cut into test samples. The samples were placed on anodized aluminum test coupons, heated, and photolyzed according to the procedure of Example 5. After photolyzing, the corners of all of the layers were rounded, indicating that flow had occurred and the material was not cured before a bond was formed. Additionally, the adhesive layer remained noticeably fluid so that it could bond to an adherend.

TABLE 3

| Materials (in parts) | Ex 12 | Ex 13 | Ex 14 |
| --- | --- | --- | --- |
| Elvax 40W | 70 | 70 | 70 |
| CA Resin | 10 | 10 | — |
| Epon 828 | 20 | 20 | 20 |
| Camphorquinone | 0.125 | — | — |
| 1,3-Diphenyl Isobenzofuran | — | 0.02 | 0.02 |
| CD-1012 catalyst | 0.25 | 0.25 | 0.25 |

Primed foam cores described in Example 4 were placed on anodized aluminum test coupons and the bulk layers of Examples 12, 13, and 14 were placed on top of the primed cores. The samples were then heated and photolyzed according to the procedure in Example 5. After photolyzing, the corners of the bulk layers were rounded, indicating that the material was not cured sufficiently prior to bond formation which allowed the sealant construction to flow adequately.

Examples 15–17

Example 15 utilizes is the bulk layer of Example 5. The bulk layers of Examples 16–17 were prepared according to the procedure of Example 5. The composition of Example 16 was 75 parts of polyester (Dynapol™402), 25 parts of epoxy (Epon™828), 0.1 part of Catalyst A, and 0.1 part of caprolactone.

The composition of Example 17 was 75 parts of polyester (Dynapol™51402), 25 parts of epoxy (ERL-4221), 0.25 parts of camphorquinone, and 0.25 parts of iodonium salt (CD-1012). This Example is identical to Example 15 except that it contained a greater amount of the photosensitizer camphorquinone.

Each bulk layer was cut into strips measuring 12.7 mm by 102 mm. The strips were placed on 0.127 mm thick anodized aluminum foil. The strips were heated at 120° C. for about 3 minutes until all of the samples appeared molten on the surface.

The samples were then photolyzed according to the procedure described in Example 5, except that each sample was given three consecutive passes through the Fusion Systems processor. After the third pass, the samples were examined for skinning over by pushing a tongue depressor into the surface of the sample. If the surface had gelled sufficiently to form a skin, wrinkling on the surface was visible. Example 17 was the only sample to exhibit skin formation, indicating a faster curing rate than either Examples 15 or 16.

New samples of each Example were then heated and given five consecutive passes through the processor. After the fifth pass, Examples 17 and 15 exhibited skin formation, indicating that Example 17 had the fastest curing rate and Example 16 had the slowest curing rate.

Example 18

The composition of Example 16 was extruded to a thickness of 0.127 mm to form an adhesive layer. This adhesive layer was laminated to the 3 mm thick bulk layer of Example 17. The bulk layer side of the laminate was placed on an anodized aluminum foil and the composite was heated in an oven at 120° C. for about 3 minutes until the surface was molten. The composite was then given five passes through the Fusion Systems process. After the fifth pass, there was no evidence of skin formation on the surface while the edges and corners were sharp.

Other embodiments are within the following claims. While the invention has been described with reference to the particular embodiments and drawings set forth above, the spirit of the invention is not so limited and is defined by the appended claims.

What is claimed is:

1. An article for establishing a seal between two substrates, comprising:
    (a) a conformable, compressible, melt flow-resistant foam core;
    (b) a photo-activated, epoxy-containing bulk layer having a first and second major surface, said foam core bonded to the second major surface of said bulk layer; and
    (c) an epoxy-containing adhesive layer bonded to the first major surface of said bulk layer, wherein upon photo-activation, said bulk layer has a different curing rate than said adhesive layer.

2. An article as recited in claim 1, wherein each of said bulk layer and said adhesive layer comprises a blend of (a) an epoxy resin, (b) a resin selected from the group consisting of polyacrylates, ethylene vinyl acetates, polyesters, vinyl acetates, polycaprolactones and combinations thereof, and each layer includes a photo-initiator.

3. An article as recited in claim 1, wherein said bulk layer and said adhesive layer contain epoxy-containing compositions that substantially retain their shape when heated to a temperature greater than the softening temperature of the compositions, but less than about 200° C., until photo-activated.

4. An article as recited in claim 1, wherein said foam core comprises a foam selected from the group consisting of arcylic, urethane and polyolefin foams.

5. An article as recited in claim 1, wherein said foam core comprises a pressure sensitive adhesive.

6. An article as recited in claim 1, wherein said adhesive layer has an exposed outer surface bondable to a substrate.

7. An article as recited in claim 1, wherein said foam core has an exposed surface suitable for bonding to one substrate.

8. A construction comprising a article as recited in claim 1, wherein said bulk layer is bonded to a glass substrate.

9. The construction as recited in claim 8, wherein said glass substrate is a windshield adapted for use in a motor vehicle.

10. The construction as recited in claim 8, further comprising another substrate comprising metal wherein said adhesive layer is bonded to said metal.

11. An article as recited in claim 1, wherein the curing rate of said bulk layer is greater than the curing rate for said adhesive layer.

12. An article as recited in claim 1, wherein said difference in curing rate of said bulk layer and said adhesive layer is achieved by adjusting one or more parameters selected from the group consisting of photo-initiators, concentration of photo-initiators, absorption wavelength of photo-initiators, extintion coefficient, sensitizers, inhibitors, accelerators epoxy type, and a thickness of said bulk layer, said adhesive layer or both.

13. An article as recited in claim 1, wherein said adhesive layer has a thickness in the range of about 0.0125 mm to about 0.25 mm.

14. An article as recited in claim 1, wherein the total thickness of said article is in the range of about 0.5 mm to about 17 mm.

15. An article as recited in claim 1, wherein the bulk layer, the adhesive layer or both of the bulk layer and the adhesive layer further contain an accelerator.

16. An article as recited in claim 1, wherein the core layer, the bulk layer, and the adhesive layer each have an ultimate tensile strength, and wherein the ultimate tensile strength of the core layer is no greater than the ultimate tensile strength of either the bulk layer or the adhesive layer.

17. An article as recited in claim 1, further comprising a tie layer between the core layer and the bulk layer.

18. An article as recited in claim 1, wherein the adhesive layer is continuous.

19. A construction comprising:
(I) an article for establishing a seal between two substrates, comprising:
  (a) a conformable, compressible, melt flow-resistant foam core;
  (b) a photo-activated, epoxy-containing bulk layer having a first and second major surface, said foam core bonded to the second major surface of said bulk layer; and
  (c) an epoxy-containing adhesive layer bonded to the first major surface of said bulk layer, wherein upon photo-activation, said bulk layer has a different curing rate than said adhesive layer;
(II) a glass substrate bonded to the foam core; and
(III) a second substrate bonded to the adhesive layer, wherein the second substrate is selected from glass, metal, plastic, wood, and ceramic.

20. A construction comprising:
(I) an article for establishing a seal between two substrates, comprising:
  (a) a conformable, compressible, melt flow-resistant foam core;
  (b) a photo-activated, epoxy-containing bulk layer having a first and second major surface, said foam core bonded to the second major surface of said bulk layer; and
  (c) an epoxy-containing adhesive layer bonded to the first major surface of said bulk layer, wherein upon photo-activation, said bulk layer has a different curing rate than said adhesive layer;
(II) a first substrate bonded to the foam core; and
(III) a second substrate bonded to the adhesive layer; wherein the first substrate and the second substrate are each independently selected from glass, metal, plastic, wood, and ceramic substrates.

* * * * *

UNITED STATES PATENT AND TRADEMARK OFFICE
CERTIFICATE OF CORRECTION

PATENT NO.     : 6,740,399 B1
DATED          : May 25, 2004
INVENTOR(S)    : George, Clayton A.

It is certified that error appears in the above-identified patent and that said Letters Patent is hereby corrected as shown below:

Title page,
Item [56], References Cited, OTHER PUBLICATIONS, insert the following:
-- Patent abstracts of Japan, vol. 1998, no. 12 & JP 10 195393 A, July 28, 1998 --;

Column 1,
Line 7, delete "incorperated", insert in place thereof -- incorporated --;
Line 25, delete "cuing", insert in place thereof -- curing --;
Line 54, delete "fame", insert in place thereof -- frame --;
Line 55, delete "use", insert in place thereof -- rise --;

Column 3,
Line 59, delete "sin-over", insert in place thereof -- skin-over --;

Column 4,
Line 9, delete "source", insert in place thereof -- surface --;

Column 5,
Line 21, after "techniques" insert -- . --;

Column 6,
Line 22, delete "4epoxy", insert in place thereof -- 4 epoxy --;
Line 65, delete "polymerzable", insert in place thereof -- polymerizable --;

Column 7,
Line 3, delete "tackfiers", insert in place thereof -- tackifiers --;
Line 8, after "thereof", insert -- . --;
Line 15, after "Law" delete ",", insert in place thereof -- ) --;

Column 9,
Lines 64-65, delete "filters", insert in place thereof -- fillers --;

Column 10,
Line 8, delete "respectve", insert in place thereof -- respective --;
Line 49, after "stabilizers", insert -- , --;
Line 60, delete "bemused", insert in place thereof -- be used --;

UNITED STATES PATENT AND TRADEMARK OFFICE
CERTIFICATE OF CORRECTION

PATENT NO. : 6,740,399 B1
DATED : May 25, 2004
INVENTOR(S) : George, Clayton A.

It is certified that error appears in the above-identified patent and that said Letters Patent is hereby corrected as shown below:

Column 11,
Line 38, delete "substrate", insert in place thereof -- substrates --;
Line 45, delete "polycaibonate", insert in place thereof -- polycarbonate --;
Line 48, delete "polybarbonate", insert in place thereof -- polycarbonate --;
Line 56, after "of", insert -- , --;

Column 12,
Line 11, delete "temple", insert in place thereof -- temperature --;
Line 49, delete "prerable", insert in place thereof -- preferable --;

Column 13,
Line 16, delete "damped", insert in place thereof -- clamped --;
Line 48, delete "U", insert in place thereof -- as --;

Column 14,
Line 26, delete "Dynapon" insert in place thereof -- Dynapol --;
Line 55, delete "lacure", insert in place thereof -- Irgacure --;

Column 15,
Line 7, delete "calorimeter", insert in place thereof -- colorimeter -- in both instances;
Line 23, delete "millihoules", insert in place thereof -- milliJoules --;
Line 56, delete "Eastnan", insert in place thereof -- Eastman --;

Column 18,
Line 6, delete "Dynapol$^{TM}$402", insert in place thereof -- Dynapol$^{TM}$51402 --;

UNITED STATES PATENT AND TRADEMARK OFFICE
CERTIFICATE OF CORRECTION

PATENT NO. : 6,740,399 B1
DATED : May 25, 2004
INVENTOR(S) : George, Clayton A.

It is certified that error appears in the above-identified patent and that said Letters Patent is hereby corrected as shown below:

Column 19,
Line 12, delete "arcylic", insert in place thereof -- acrylic --;
Line 36, delete "extintion", insert in place thereof -- extinction --.

Signed and Sealed this

Twenty-third Day of November, 2004

JON W. DUDAS
*Director of the United States Patent and Trademark Office*